Figure 2:
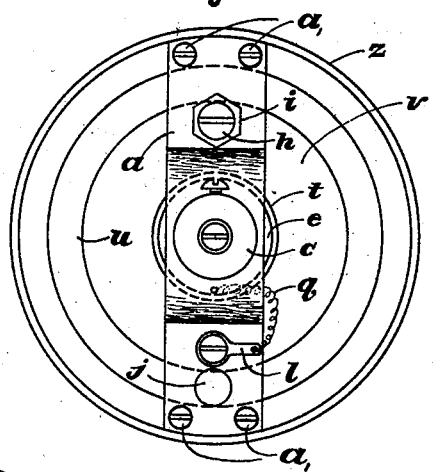

No. 819,522. PATENTED MAY 1, 1906.
E. R. CORWIN & F. R. PARKER.
TELEPHONE TRANSMITTER.
APPLICATION FILED MAY 6, 1903.

2 SHEETS—SHEET 1.

WITNESSES:
Arthur Lee
J. B. Marack

INVENTORS:
Elmer R. Corwin
Frederick R. Parker

No. 819,522. PATENTED MAY 1, 1906.
E. R. CORWIN & F. R. PARKER.
TELEPHONE TRANSMITTER.
APPLICATION FILED MAY 6, 1903.

2 SHEETS—SHEET 2.

WITNESSES:
Arthur Lee.
J. B. Marack

INVENTORS:
Elmer R. Corwin
Frederick R. Parker.

UNITED STATES PATENT OFFICE.

ELMER R. CORWIN, OF WEST LAFAYETTE, AND FREDERICK R. PARKER, OF LA FAYETTE, INDIANA; SAID CORWIN ASSIGNOR TO SAID PARKER.

TELEPHONE-TRANSMITTER.

No. 819,522.     Specification of Letters Patent.     Patented May 1, 1906.

Application filed May 6, 1903. Serial No. 155,871.

*To all whom it may concern:*

Be it known that we, ELMER R. CORWIN, residing at West Lafayette, and FREDERICK R. PARKER, residing at La Fayette, in the county of Tippecanoe and State of Indiana, citizens of the United States, have invented new and useful Improvements in Telephone-Transmitters, of which the following is a full, clear, concise, and exact description, reference being had to the accompanying drawings, forming a part of this specification.

Our invention relates to telephone-transmitters, our object being, first, to provide an improved form of battery-transmitter employing granular carbon or equivalent material interposed between the electrodes, in which the electric currents are confined to the two electrodes and the granular carbon, the speaking-diaphragm and frame of the transmitter being entirely insulated from the said electric currents; second, to provide a speaking-diaphragm which is entirely free from all mechanical arrangements connecting it permanently to the working parts of the transmitter, but which merely touches a point at its center when the transmitter is in adjustment; third, to provide a secondary diaphragm which constitutes one of the said electrodes and which is entirely inclosed and insulated from the speaking-diaphragm; fourth, to provide an improved form of cup for carrying the granular carbon or equivalent material and the two electrodes, and, fifth, to provide an improved form of dampener-springs for the speaking-diaphragm, which are capable of adjustment.

In our present invention we have shown a telephone-transmitter in which the granular carbon and two electrodes are carried by a non-conducting cup, the back electrode being fastened permanently to the said cup, while the front electrode, which is the secondary diaphragm, is held in place by a ring screwed to the said cup. A small projecting pin is carried by an insulating-disk, which is held to the secondary diaphragm by the said ring and touches against the speaking-diaphragm when the transmitter is in adjustment. The speaking-diaphragm is held in place by two spiral dampener-springs, which are adjusted against the speaking-diaphragm to give the desired tone in the transmitter.

We have illustrated our invention in the accompanying drawings, in which—

Figure 1:
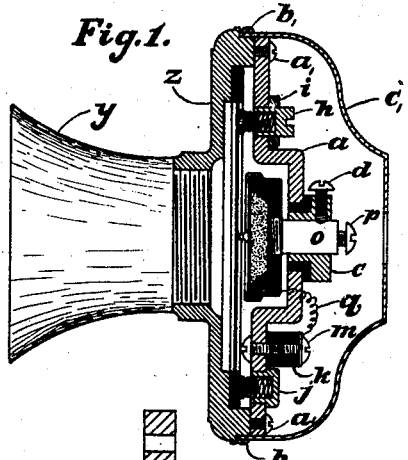
Figure 4:
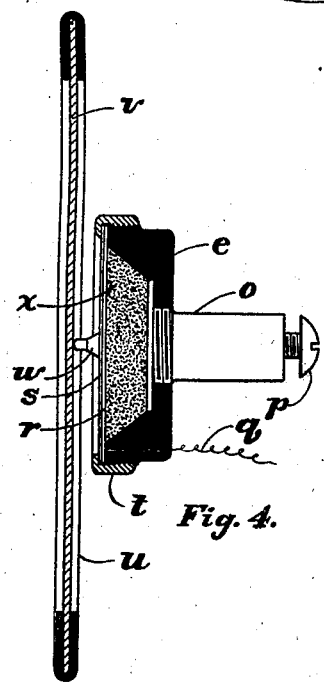
Figure 3:
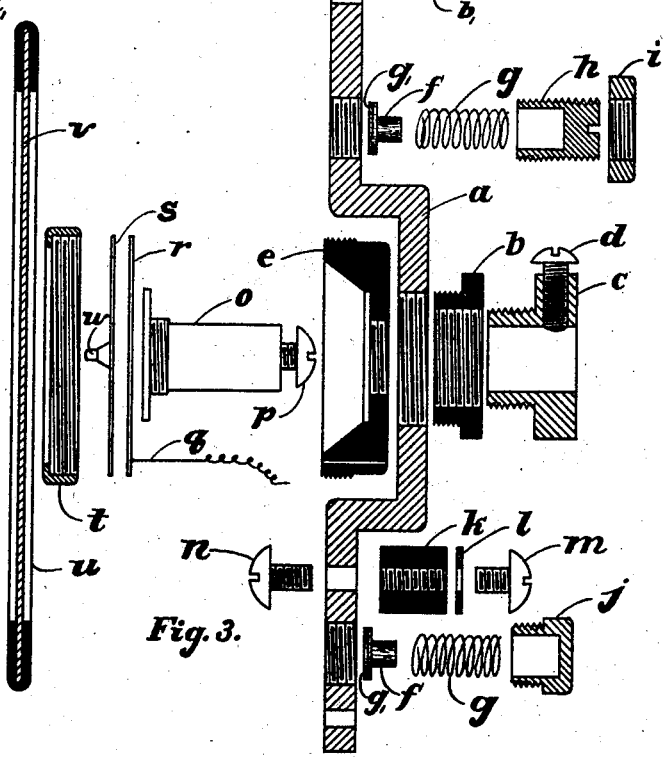
Figure 6:
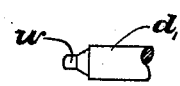
Figure 5:
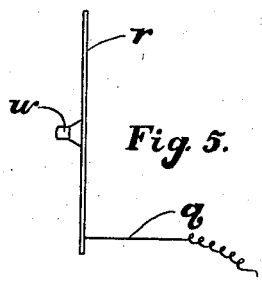
Figure 7:
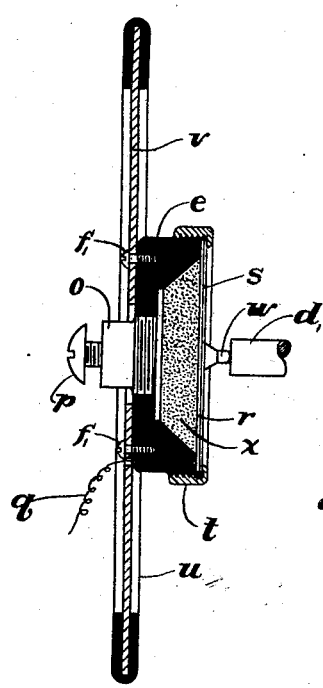
Figure 8:
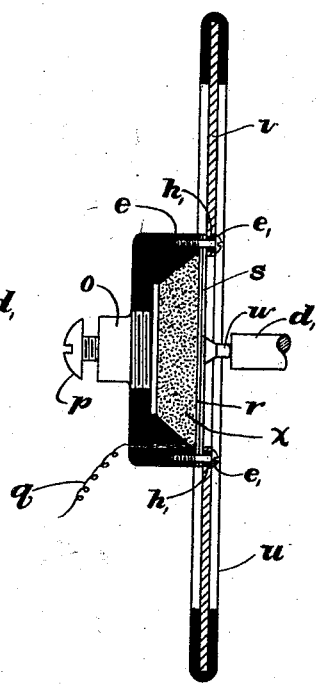
Figure 9:

Figure 1 is a vertical sectional view taken through the axis of the transmitter, portions of the structure being shown in elevation. Fig. 2 is a rear view of the transmitter, the inclosing shell being removed to show details of construction. Fig. 3 is an enlarged view of elements shown in Fig. 1 in separated relation. Fig. 4 is an enlarged view of a portion of Fig. 1. Fig. 5 is a view showing the secondary diaphragm with projecting pin attached thereto. Fig. 6 is a view showing a stationary post with projecting pin attached thereto. Fig. 7 is an enlarged sectional view of a portion of a modified form of transmitter, taken through the axis thereof with portions shown in elevation and showing the electrode-carrying cup attached to the back side of the speaking-diaphragm. Fig. 8 is an enlarged sectional view of a portion of another modified form of transmitter, taken the same as Fig. 7 and showing the electrode-carrying cup attached to the front side of the speaking-diaphragm. Fig. 9 is an enlarged sectional view of the speaking-diaphragm, taken through its axis, showing the projecting pin attached thereto.

Like characters refer to like parts in the different figures.

In our present invention we have employed the general arrangement frequently found in other transmitters, there being provided the usual mouthpiece $y$, secured to the front plate $z$ by threaded engagement therewith, a shell $c$ being fastened to the plate $z$ by the screws $b$, thus inclosing the transmitter parts. The front plate $z$ is provided with an annular recess in which is placed a folded soft-rubber ring $u$, the speaking-diaphragm $v$ being contained between the folds of the ring $u$, as shown. The usual bridge $a$ is secured to the front plate $z$ by the screws $a'$, the bridge being U-shaped at its middle, so as to provide a space for the electrode-carrying cup $e$.

The cup $e$ is made of insulating material, preferably hard rubber, and is secured to the back electrode $o$ by threaded engagement therewith, as shown in Fig. 4. Although we preferably secure the electrode-carrying cup $e$ to the bridge $a$ through the agency of the back electrode $o$, as shown in Fig. 1, we desire it to be understood that the said cup may be secured to the back side of the speaking-diaphragm, as shown in Fig. 7, or to the front side of the speaking-diaphragm, as shown in Fig. 8. When the back electrode o is in place, as shown in Fig. 4, the chamber in the cup e is conical in shape, with the top of the cone cut off by the back electrode o. This chamber contains the granular carbon x or equivalent material. The front electrode or secondary diaphragm r and mica disk s are held to the cup e by the ring t being screwed to the cup e, the electrode r making contact with the granular carbon x. In Fig. 8 the speaking-diaphragm v takes the place of the ring t. The disk s is preferably mica, but may be of any insulating material. The electrodes o and r are preferably gold-plated; but it is to be understood that electrodes of other material may be used instead. Conductor q is soldered to the front electrode r. The projecting pin w is cemented to the mica disk s, as shown in Fig. 3. If the said projecting pin is made of insulating material, the said mica disk may be dispensed with entirely, in which case the said projecting pin will be secured to the secondary diaphragm, as shown in Fig. 5. It will also be understood that a conducting projecting pin may be secured direct to the secondary diaphragm, as the speaking-diaphragm is insulated from the frame of the transmitter. In the arrangements shown in Figs. 7 and 8 it is to be understood that the projecting pin w may be secured to a rigid post d, as shown in Fig. 6, the post d being in turn secured to the bridge or frame of the transmitter. It is also to be understood that the said projecting pin w may be secured to the speaking-diaphragm, as shown in Fig. 9, instead of being secured to the disk s, as shown in Fig. 3, or to the secondary diaphragm, as shown in Fig. 5. The insulating-bushing b is screwed through the bridge a, and the metal bushing c is in turn screwed through the bushing b, as shown in Fig. 1. The back electrode o extends through the bushing c and is secured thereto by the set-screw d. Thus it will be seen that by the set-screw d the pin w may be adjusted against the speaking-diaphragm v with any desired pressure.

The hollow screw h is secured to the bridge a by threaded engagement therewith and is locked by the nut i. One end of a coil-spring g is inserted into the hollow of screw h, while the other end of spring g carries a pin f, with a felt covering g'. The pin f is preferably made of soft rubber with a felt covering g' next to the speaking-diaphragm; but any other material may be used. The covering g' of pin f therefore rests on the speaking-diaphragm v and may be given any pressure desired against the speaking-diaphragm by adjusting the screw h, and thereby dampen the speaking-diaphragm so as to give the desired tone in the transmitter. The hollow cap j is also secured to the bridge a by threaded engagement therewith and, like screw h, contains one end of a coil-spring g. This coil-spring also carries a pin f, with a covering g', which rest against the rubber ring u.

The binding-post k is secured to the bridge a by the screw n, and the clip l is secured to the binding-post k by the screw m. The binding-post k is made of hard rubber, and the screws m and n do not meet, thus insulating the clip l from the bridge a. The secondary diaphragm r is electrically connected to the clip l by the conductor q, which passes through a hole in the cup e, as shown. The conductors leading to the transmitter will therefore be fastened, respectively, to screws m and p.

When the speaking-diaphragm v is vibrated, the vibrations are transmitted to the pin w, mica disk s, and secondary diaphragm r, due to the pressure between the pin w and the speaking-diaphragm v. The chamber in the cup e is made large in diameter next to the secondary diaphragm r, so as to give the secondary diaphragm r a larger vibrating surface to act on the granular carbon or equivalent material, and smaller in diameter next to the back electrode o, so as not to require such a large battery-current for operating the transmitter successfully. The space between the front and back electrodes is filled loosely with granular carbon or equivalent material, so as not to pack from expansion.

The secondary diaphragm r, vibrating against the granular carbon x, changes the pressure on the said carbon, and therefore changes its resistance, thus producing the talking-currents in the usual manner, provided the transmitter is furnished with the necessary electric current. The talking-currents traverse the back electrode o, granular carbon or equivalent material x, secondary diaphragm or front electrode r, conductor q, and clip l, the remainder of the transmitter, except the ring t and screws m and p, being insulated therefrom.

In case the arrangement shown in Fig. 5 is used, where the projecting pin is a conductor, the speaking-diaphragm is not insulated from the secondary diaphragm or front electrode.

In Fig. 7 the speaking-diaphragm v is cut out, so as to allow the back electrode o to pass through it without making contact therewith. The speaking-diaphragm is also cut out to accommodate the conductor q. The cup e is secured to the speaking-diaphragm v by the screws f'. In this arrangement the granular carbon or equivalent material is acted upon by the projecting pin pressing against the rigid post d' as the speaking-diaphragm is vibrated.

In Fig. 8 the speaking-diaphragm is cut out so as to allow the disk s to present an exposed surface. The cup e is secured to the speaking-diaphragm v by the screws e', rubber bushings *h'* being used to insulate the said screws from the speaking-diaphragm. In this arrangement the granular carbon is acted upon in a manner similar to that described for Fig. 7.

While we have herein shown and particularly described the preferred types of our invention, we do not wish to limit ourselves to the precise construction and arrangement herein shown.

Having thus described our invention, what we claim as new and desire to secure by Letters Patent, is—

1. In a transmitter the combination with the speaking-diaphragm thereof, of a projecting pin making contact therewith, an insulating-disk to which the projecting pin is secured, and a secondary diaphragm resting against the insulating-disk, substantially as described.

2. In a telephone-transmitter, a diaphragm, a rigid portion extending over the diaphragm, a dampener-button for the diaphragm, and a coil-spring supported by the said rigid portion and capable of adjustment to adjust the dampener-button.

3. In a transmitter, the combination with the speaking-diaphragm thereof, of a secondary diaphragm, a flexible insulating-disk held against the secondary diaphragm and covering same, and a pin interposed between the speaking-diaphragm and the insulating-disk, for the purpose of transmitting the vibrations of the speaking-diaphragm to the secondary diaphragm, substantially as described.

4. In a transmitter, the combination with the electrode-containing cup thereof, of a back electrode contained therein, a threaded ring screwed to the said cup, a front electrode held to the cup by the said ring, an insulating-disk held to the front electrode by the said ring, and a projecting pin secured to the insulating-disk, substantially as described.

5. In a transmitter, the combination with the electrode-carrying cup thereof, of an electrode contained in the said cup, a threaded ring secured to the said cup, a secondary diaphragm used as the other electrode and secured to the said cup by the said ring, an insulating-disk held to the secondary diaphragm by the said ring, and a projecting pin secured to the said disk, substantially as described.

6. In a transmitter, the combination with the electrode-carrying cup thereof, of an electrode rigidly contained in the said cup, a ring secured to the said cup by threaded engagement therewith, a secondary diaphragm used as the other electrode and secured to the said cup by the said ring, a conical-shaped chamber in the said cup between the said electrodes, the larger diameter of which is next to the secondary diaphragm, the said chamber being used to contain the granular carbon or equivalent material, an insulating-disk held to the said secondary diaphragm by the said ring, and a projecting pin secured to the said disk, substantially as described.

7. In a transmitter, the combination with the electrode-carrying cup thereof, of a gold-plated electrode rigidly contained in the said cup, a ring secured to the said cup by threaded engagement therewith, a gold-plated secondary diaphragm used as the other electrode and secured to the said cup by the said ring, a conical-shaped chamber in the said cup between the said gold-plated electrodes, the larger diameter of which is next to the said secondary diaphragm, the said chamber being used to contain the granular carbon or equivalent material, a mica disk held to the said secondary diaphragm by the said ring, and a projecting pin secured to the mica disk, substantially as described.

8. In a transmitter, the combination with the electrode-carrying cup thereof, of a gold-plated back electrode contained in and secured to the said cup by threaded engagement therewith, a ring secured to the said cup by threaded engagement therewith, a gold-plated secondary diaphragm used as the front electrode and secured to the said cup by the said ring, a conical-shaped chamber in the said cup between the said gold-plated electrodes, the larger diameter of which is next to the said secondary diaphragm, the said chamber being used to contain the granular carbon or equivalent material, a mica disk held to the said secondary diaphragm by the said ring, and a projecting pin secured to the mica disk, substantially as described.

9. In a transmitter, the combination with the speaking-diaphragm thereof, of a secondary diaphragm used as an electrode, an insulating-disk held to the secondary diaphragm, a projecting pin secured to the said disk and interposed between the said disk and the speaking-diaphragm, the projecting pin touching the speaking-diaphragm when the transmitter is in adjustment, an electrode-carrying cup made of insulating material and to which the secondary diaphragm is held, an electrode contained in the said cup and secured thereto, and means whereby the projecting pin may be adjusted against the speaking-diaphragm, substantially as described.

10. In a transmitter, the combination with the speaking-diaphragm thereof, of a secondary diaphragm used as one electrode, an insulating-disk held against the secondary diaphragm, a projecting pin making contact with the insulating-disk and the speaking-diaphragm when the transmitter is in adjustment, an electrode-carrying cup to which the secondary diaphragm is held, a conductor soldered to the secondary diaphragm and extending through a hole in the said cup, an electrode secured to and contained in the said cup, and means whereby the insulating-disk may be adjusted relatively to the speaking-diaphragm, substantially as described.

11. In a telephone-transmitter, a button comprising a receptacle for retaining comminuted material, comminuted material in the receptacle, a flexible electrode covering the comminuted material and secured at its periphery to the button, and an insulating material applied to one surface of the said electrode and covering same.

12. In a transmitter, the combination of a speaking-diaphragm, a granule-containing means, a flexible secondary diaphragm secured at its periphery to the granule-containing means and used as an electrode, a flexible insulating-disk covering the secondary diaphragm, and means for transmitting the vibrations of the speaking-diaphragm to the secondary diaphragm.

13. In a transmitter, the combination with the granule-containing cup thereof, of an electrode contained in the said cup and secured thereto by threaded engagement therewith, a flexible diaphragm used as the other electrode, an insulating-disk, a ring adapted to secure the said diaphragm and said disk to the said cup, by threaded engagement therewith, means for connecting the electrodes in the circuit, and means for vibrating the diaphragm.

14. In a telephone-transmitter, a button comprising a receptacle for retaining comminuted material, comminuted material in the receptacle, a flexible electrode covering the comminuted material and secured at its periphery to the button, an insulating covering for the exposed surface of the said electrode, and a second electrode supporting the button.

15. In a transmitter, the combination with the speaking-diaphragm thereof, of a projecting pin which rests against the speaking-diaphragm when the transmitter is in adjustment, a mica disk to which the projecting pin is secured, a gold-plated secondary diaphragm used as an electrode, an insulating electrode-carrying cup to which the mica disk and gold-plated secondary diaphragm are secured by a ring having threaded engagement with the cup, the secondary diaphragm being between the said cup and mica disk, a gold-plated electrode contained in and secured to the said cup, by threaded engagement therewith, a conical-shaped chamber in the said cup, for carrying the granular carbon or equivalent material, and interposed between the gold-plated electrodes, the larger diameter of the said chamber being next to the secondary diaphragm, means for adjusting the projecting pin against the speaking-diaphragm, and means whereby electrical conductors may be attached to the respective electrodes, substantially as described.

16. In a transmitter, the combination with the speaking-diaphragm thereof, of an electrode-carrying cup, an electrode contained in and secured to the said cup, a secondary diaphragm used as an electrode and held to the said cup, an insulating-disk held against the secondary diaphragm, and a projecting pin secured to the said disk, and interposed between the latter and the speaking-diaphragm, substantially as described.

17. In a transmitter, the combination with the speaking-diaphragm thereof, of an electrode-carrying cup, an electrode contained in and secured to the said cup, a secondary diaphragm used as an electrode and held to the said cup, a flexible insulating-disk held against the secondary diaphragm, thus inclosing the latter and a pin interposed between the insulating-disk and the speaking-diaphragm, substantially as described.

18. In a transmitter, the combination with the speaking-diaphragm thereof, of an electrode-carrying cup, an electrode contained in and secured to the said cup, a flexible secondary diaphragm used as an electrode and held to the said cup, a pin interposed between the said diaphragms, a flexible sheet of insulation between the said pin and secondary diaphragm and covering the latter, and means for adjusting the said pin to enable it to transmit the vibrations of the speaking-diaphragm to the secondary diaphragm.

19. In a transmitter, the combination with the speaking-diaphragm thereof, of an insulating, electrode-carrying cup, a gold-plated electrode contained in and secured to the said cup and insulated from the speaking-diaphragm, a gold-plated, flexible, secondary diaphragm used as an electrode and secured to the said cup, a mica disk held to the secondary diaphragm, a conical-shaped chamber in the said cup between the said electrodes, and used for containing the granular carbon or equivalent material, a projecting pin secured to the mica disk, means whereby the said pin may be adjusted so as to enable it to transmit vibrations from the speaking-diaphragm to the secondary diaphragm, and means whereby the said electrodes may be electrically connected to respective conductors leading from the transmitter, substantially as described.

20. In a transmitter, the combination with the speaking-diaphragm thereof, of a granule-containing means, a flexible electrode in the form of a diaphragm and secured at its periphery to the granule-containing means, a sheet of insulating material completely covering the said electrode, and means for transmitting vibrations between the speaking-diaphragm and the said electrode.

21. In a transmitter, the combination with the speaking-diaphragm thereof, of a dampener-button held thereto, a coil-spring for holding the dampener-button against the speaking-diaphragm, a socket for holding the coil-spring, and a screw-adjustment to the said socket whereby the said button may be adjusted against the speaking-diaphragm through the agency of the coil-spring, substantially as described.

22. In a transmitter, the combination with the speaking-diaphragm thereof, of an annular, rubber fold in which the edge of the speaking-diaphragm is inserted, a dampener-button held against the said rubber fold, a coil-spring for holding the dampener-button against the rubber fold, and a socket secured to the bridge of the transmitter and adapted to hold the coil-spring in place, substantially as described.

23. In a transmitter, the combination with the speaking-diaphragm thereof, of a dampener-button held against the speaking-diaphragm, the said dampener-button being covered with a felt covering next to the speaking-diaphragm, a coil-spring which holds the dampener-button against the speaking-diaphragm, a hollow screw secured to the bridge of the transmitter by threaded engagement therewith and which contains one end of the coil-spring, a lock-nut which locks the hollow screw to the bridge, and means whereby the hollow screw may be adjusted to adjust the coil-spring which in turn adjusts the pressure of the dampener-button against the speaking-diaphragm, substantially as described.

24. In a transmitter, the combination of a speaking-diaphragm, a bridge, a dampener-button which rests against the speaking-diaphragm, a coil-spring adapted to hold the dampener-button to the speaking-diaphragm, a hollow screw in which one end of the coil-spring is inserted, the said hollow screw being secured to the said bridge by threaded engagement therewith, a lock-nut by which the hollow screw may be locked to the bridge, means whereby the hollow screw may be adjusted to adjust the said dampener-button against the speaking-diaphragm, an annular rubber fold in which the edge of the speaking-diaphragm is inserted, a second dampener-button which rests against the said rubber fold, a second coil-spring adapted to hold the said second dampener-button against the said rubber fold, and a hollow nut in which one end of the said second coil-spring is inserted and which is secured to the said bridge, substantially as described.

25. In a device of the character described, a granule-containing means, flexible diaphragms, one being an electrode and secured at its periphery to the granule-containing means, insulating material covering one surface of the said electrode, and means for transmitting vibrations from one diaphragm to another.

26. In a transmitter, the combination with the speaking-diaphragm thereof, of a granule-containing means, a flexible secondary diaphragm used as an electrode and secured at its periphery to the granule-containing means, means interposed between the said diaphragms and arranged to transmit the vibrations of one to the other, and an insulating material covering the secondary diaphragm.

27. In a transmitter, the combination of a speaking-diaphragm, an electrode-carrying cup, a flexible electrode secured at its periphery to the electrode-carrying cup and covered by an insulating material, and a pin interposed between the said diaphragm and electrode and adapted to transmit the vibration of one to the other.

28. In a transmitter, the combination with the granule-containing cup thereof, of an electrode contained therein, a ring secured to the said cup, a flexible diaphragm used as the other electrode and secured to the said cup by the said ring, an insulating-disk covering the said diaphragm and held thereto by the said ring, and means for vibrating the diaphragm.

29. In a device of the character described, a granule-containing means, a speaking-diaphragm, a flexible, conducting, secondary diaphragm secured at its periphery to the granule-containing means, insulating material covering one surface of the secondary diaphragm, and means for transmitting vibrations from one diaphragm to the other.

30. In a telephone-transmitter, a diaphragm, a bridge extending over the diaphragm, a dampener-button for the diaphragm, and a coil-spring supported by the bridge and capable of adjustment to adjust the dampener-button.

31. In a transmitter, a granule-containing means, an electrode formed out of a flexible sheet of metal and a flexible sheet of insulating material secured together, and secured at its periphery to the granule-containing means, and means for vibrating the electrode, substantially as described.

32. In a transmitter, the combination with the granule-containing cup thereof, of an electrode contained in the said cup and secured thereto by threaded engagement therewith, a flexible diaphragm used as the other electrode and secured to the said cup at its periphery, a flexible insulating-disk held against the said diaphragm and covering same, and means for vibrating the latter.

33. In a transmitter of the character described, a speaking-diaphragm, an electrode-carrying means, a flexible electrode secured at its periphery to the electrode-carrying means and covered by an insulating material, and means for transmitting vibrations from the diaphragm to the electrode.

34. In a transmitter of the character described, the combination with the granule-containing means thereof, of a ring, a flexible electrode secured to the said means by the said ring, and insulating material covering one surface of the electrode.

35. In a device of the character described, a diaphragm, granule-containing means, a flexible electrode in the form of a diaphragm and secured at its periphery to the granule-containing means, insulating material covering the said electrode, and means for transmitting vibrations between the diaphragm and the electrode.

36. In a device of the character described, granule-containing means, an electrode comprising a flexible piece of metal covered on one side by insulating material and secured at its periphery to the granule-containing means, and means for vibrating the electrode.

37. In a device of the character described, the combination with the granule-containing means thereof, of a metallic electrode removably held at its periphery to the said means, and insulating material covering the electrode.

In witness whereof we hereunto subscribe our names this 2d day of May, A. D. 1903.

ELMER R. CORWIN.
FREDERICK R. PARKER.

Witnesses
ARTHUR LEE,
J. B. MARACK.